US011338453B2

(12) United States Patent
     Kamon

(10) Patent No.: US 11,338,453 B2
(45) Date of Patent: May 24, 2022

(54) JOINT STRUCTURE FOR ROBOT

(71) Applicant: KAWASAKI JUKOGYO KABUSHIKI KAISHA, Kobe (JP)

(72) Inventor: Masayuki Kamon, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 223 days.

(21) Appl. No.: 16/463,973

(22) PCT Filed: Nov. 24, 2017

(86) PCT No.: PCT/JP2017/042237
§ 371 (c)(1),
(2) Date: May 24, 2019

(87) PCT Pub. No.: WO2018/097252
PCT Pub. Date: May 31, 2018

(65) Prior Publication Data
US 2020/0269446 A1  Aug. 27, 2020

(30) Foreign Application Priority Data
Nov. 24, 2016  (JP) .............................. JP2016-228124

(51) Int. Cl.
*B25J 17/00* (2006.01)
*B25J 17/02* (2006.01)
*B25J 9/00* (2006.01)

(52) U.S. Cl.
CPC ......... *B25J 17/0275* (2013.01); *B25J 9/0009* (2013.01)

(58) Field of Classification Search
CPC ............................. B25J 9/0009; B25J 17/0275
See application file for complete search history.

(56) References Cited

U.S. PATENT DOCUMENTS

| 5,740,699 | A | * | 4/1998 | Ballantyne | ........... B25J 17/0266 403/120 |
| 2003/0101838 | A1 | | 6/2003 | Shinozaki | |
| 2015/0040711 | A1 | * | 2/2015 | Kim | ....................... B25J 9/0072 74/490.01 |

FOREIGN PATENT DOCUMENTS

| JP | H08-011080 A | | 1/1996 | |
| JP | 2003-170381 A | | 6/2003 | |
| JP | 2003170381 A | * | 6/2003 | ............ B25J 9/0042 |
| JP | 2005-161436 A | | 6/2005 | |
| JP | 2013-091145 A | | 5/2013 | |
| JP | 5872846 B2 | | 3/2016 | |

* cited by examiner

*Primary Examiner* — Randell J Krug
(74) *Attorney, Agent, or Firm* — Oliff PLC

(57) ABSTRACT

A joint structure for a robot includes a first link and a second link rotatably coupled to each other through a joint part and a first linear-motion actuator and a second linear-motion actuator coupling the first link to the second link at a part separated from the joint part. The first linear-motion actuator and the second linear-motion actuator are each connected with the first link and the second link so as to be rotatable about two axes perpendicular to each other. When the second link is in an upright state, a first shaft member and second shaft members are disposed so that an angle formed by axial centers thereof becomes a right angle and the axial centers are oriented in a horizontal direction.

4 Claims, 7 Drawing Sheets

JOINT STRUCTURE FOR ROBOT

TECHNICAL FIELD

The present disclosure relates to a joint structure for a robot.

BACKGROUND ART

It is known that a joint structure for a robot, which relatively rotates a second member about two mutually-perpendicular axes with respect to a first member (e.g., see Patent Document 1). Moreover, it is known that the waist Yaw-axis driving device which relatively swivels an upper half of a torso part of a humanoid robot to the left and right with respect to a lower half of the torso part (e.g., see Patent Document 2). [Reference Documents of Conventional Art]

PATENT DOCUMENTS

[Patent Document 1] JP5,872,846B2
[Patent Document 2] JP2005-161436A

DESCRIPTION OF THE DISCLOSURE

Problems to be Solved by the Disclosure

The present inventor has conceived of a joint structure for a robot having a novel structure, which is different from the joint structures disclosed in Patent Document 1 etc. One purpose of the present disclosure is to provide a joint structure for a robot having a novel structure.

SUMMARY OF THE DISCLOSURE

According to one aspect of the present disclosure, a joint structure for a robot is provided, which includes a first link and a second link, rotatably coupled to each other through a joint part, and a first linear-motion actuator and a second linear-motion actuator, each having a main body and a shaft member configured to linearly move in an axial center direction relatively to the main body, the linear-motion actuators coupling the first link to the second link at a part separated from the joint part. The first linear-motion actuator and the second linear-motion actuator are each connected with the first link and the second link so as to be rotatable about two axes perpendicular to each other. The joint part couples the second link to the first link so as to be rotatable about one of a first shaft member and the second shaft member. When the second link is in an upright state, the first shaft member and the second shaft member are disposed so that an angle formed by axial centers thereof becomes a right angle and the axial centers are oriented in a horizontal direction.

Thus, the second link can be pivoted to the first link around the first shaft member or the second shaft member which are perpendicular to each other and are oriented horizontally by operating the first linear-motion actuator or the second linear-motion actuator, with the simple structure.

Moreover, since the connecting direction of the first link and the second link (the direction in which the first link and the second link are disposed) can be substantially in agreement with the directions of the axial centers of the shaft members of the first linear-motion actuator and the second linear-motion actuator, the length in a direction perpendicular to the lined-up direction of the first linear-motion actuator and the second linear-motion actuator (specifically, a thickness direction of the robot) can be reduced. Therefore, the robot can be downsized.

Effects of the Disclosure

According to the joint structure for the robot of the present disclosure, the second link can be pivoted around the first shaft member or the second shaft member with respect to the first link, with the simple structure.

MODE FOR CARRYING OUT THE DISCLOSURE

Figure 1:
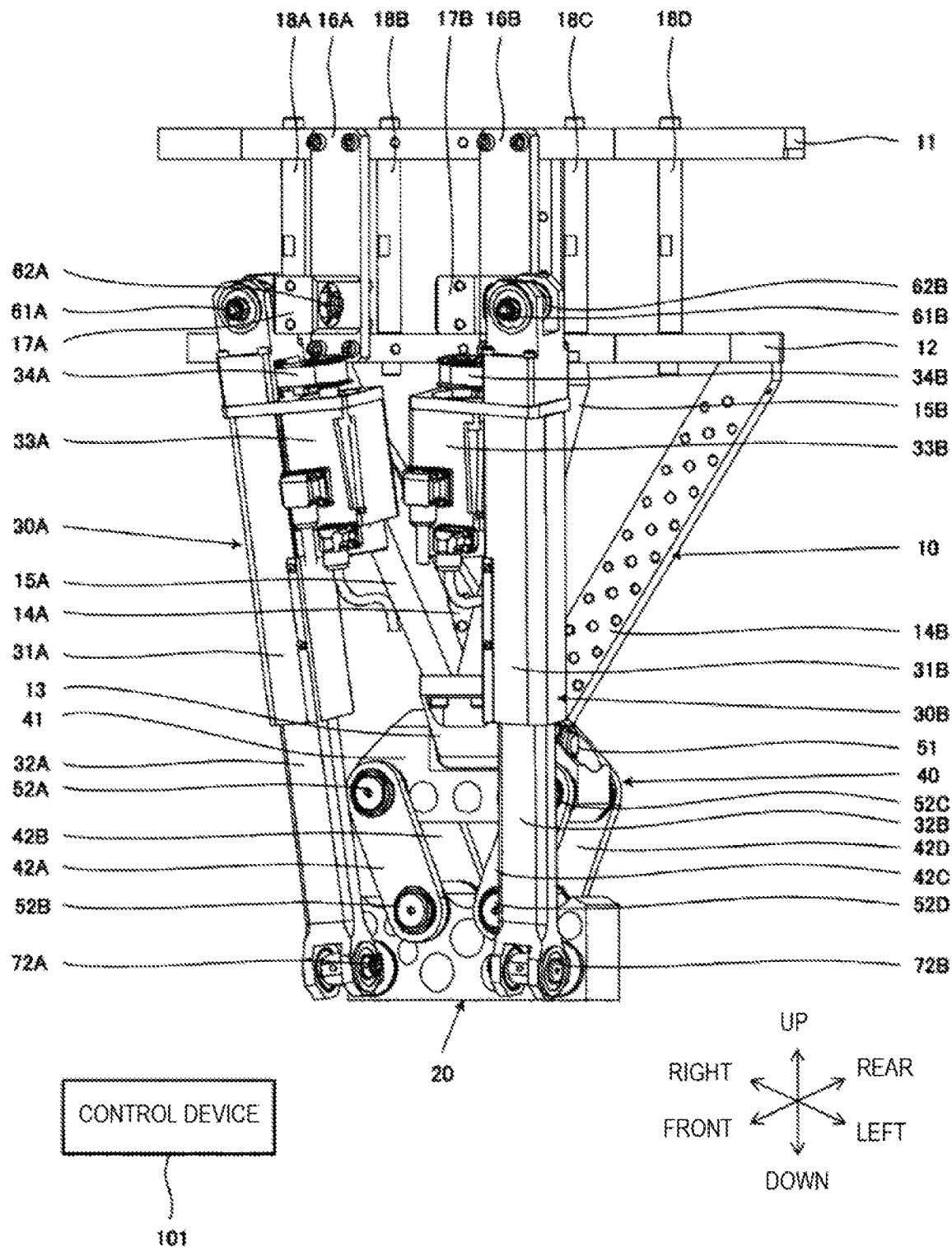
FIG. 1 is a perspective view illustrating an outline structure of a joint structure for a robot according to Embodiment 1.

Hereinafter, one embodiment of the present disclosure will be described with reference to the drawings. Note that, throughout the drawings, the same reference characters are given to the same or corresponding components to omit redundant description. Moreover, throughout the drawings, the components illustrating the present disclosure are extractedly illustrated, and illustration of other components may be omitted. Further, the present disclosure is not limited to following embodiment.

Embodiment 1

A joint structure for a robot according to Embodiment 1 includes a first link and a second link which are rotatably coupled to each other through a joint part, and a first linear-motion actuator and a second linear-motion actuator each having a main body and a shaft member which linearly moves in an axial center direction relatively with respect to the main body, the linear-motion actuator coupling the first link to the second link at a part separated from the joint part. The first linear-motion actuator and the second linear-motion actuator are connected with the first link and the second link so as to be rotatable about two axes which are perpendicular to each other. The joint part couples the second link to a first shaft member so that the second link is rotatable around and the first shaft member and the second shaft member. When the second shaft member is in an upright state, the first link and the second link are disposed so that an angle formed by their axial centers becomes a right angle and the axial centers are oriented in the horizontal direction.

Alternatively, in the joint structure for the robot according to Embodiment 1, the first linear-motion actuator and the second linear-motion actuator may be disposed so that directions of axial centers of the shaft members may be oriented in the vertical direction when carrying out a deploy and retract operation.

Alternatively, in the joint structure for the robot according to Embodiment 1, the joint part may have a first member supported by the first link so as to be rotatable around the first shaft member, and a second member which is supported by the first member so as to be rotatable around the second shaft member and is coupled to the second link.

Alternatively, in the joint structure for the robot according to Embodiment 1, the first linear-motion actuator and the second linear-motion actuator may be disposed so that an angle formed by the axial center of the shaft member of the first linear-motion actuator and the axial center of the shaft member of the second linear-motion actuator becomes an acute angle.

Below, one example of the joint structure for the robot according to Embodiment 1 will be described with reference to FIGS. 1 to 7.

[Structure of Robot]

Figure 2:
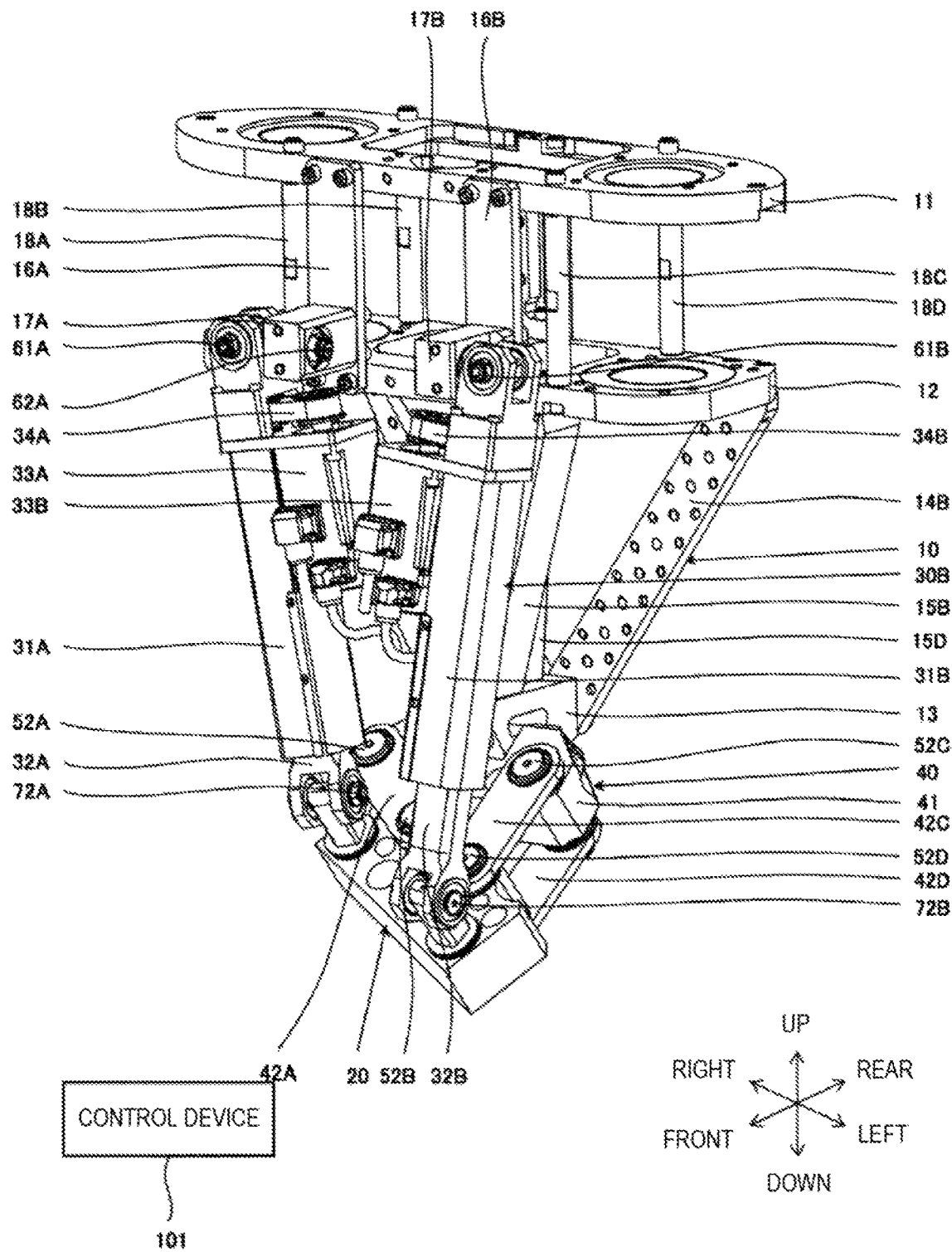
FIG. 2 is a perspective view illustrating the outline structure of the joint structure for the robot according to Embodiment 1.
Figure 3:
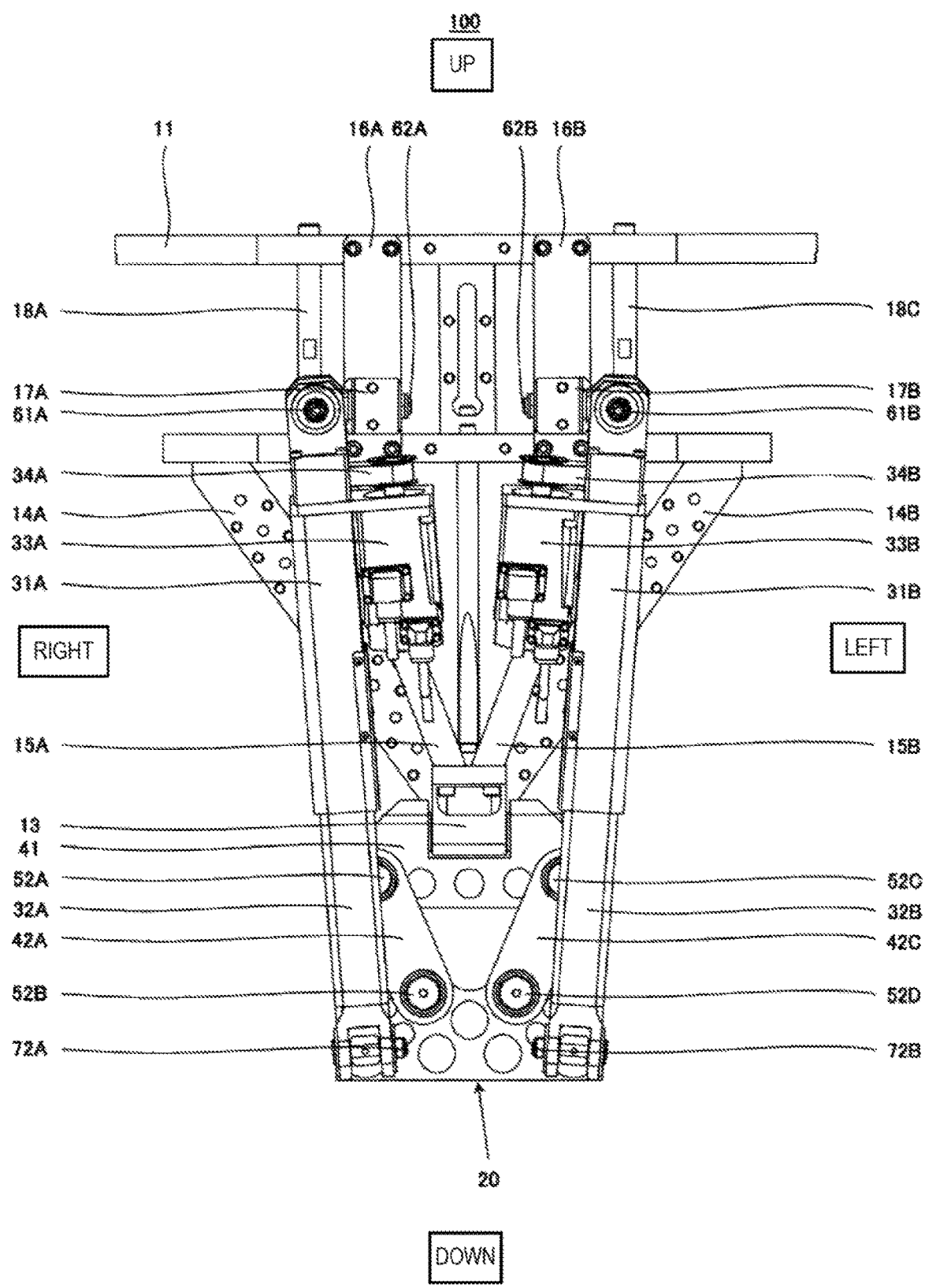
FIG. 3 is a front view illustrating the outline structure of the joint structure for the robot illustrated in FIG. 1.
Figure 4:
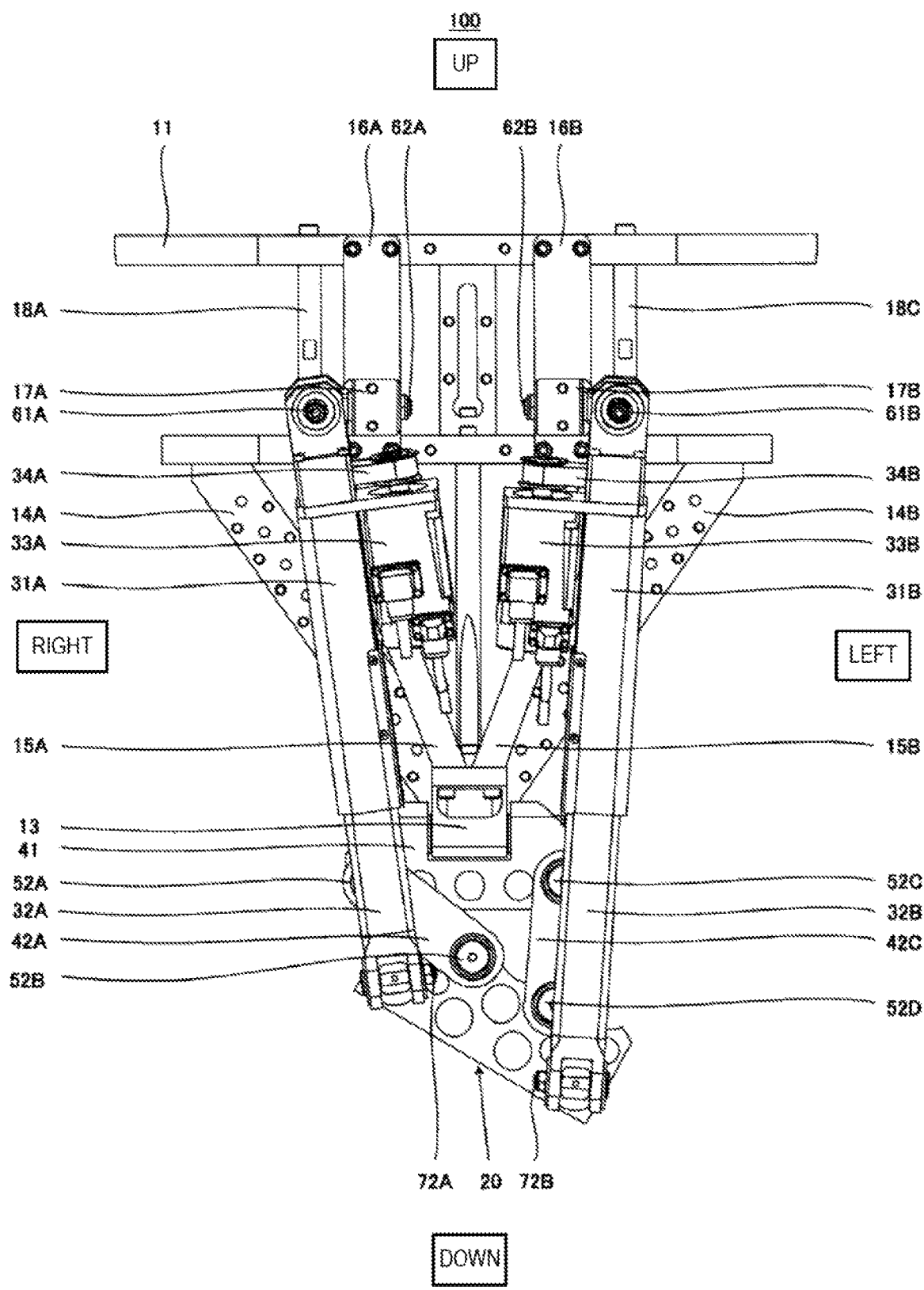
FIG. 4 is a front view illustrating the outline structure of the joint structure for the robot illustrated in FIG. 1.
Figure 5:
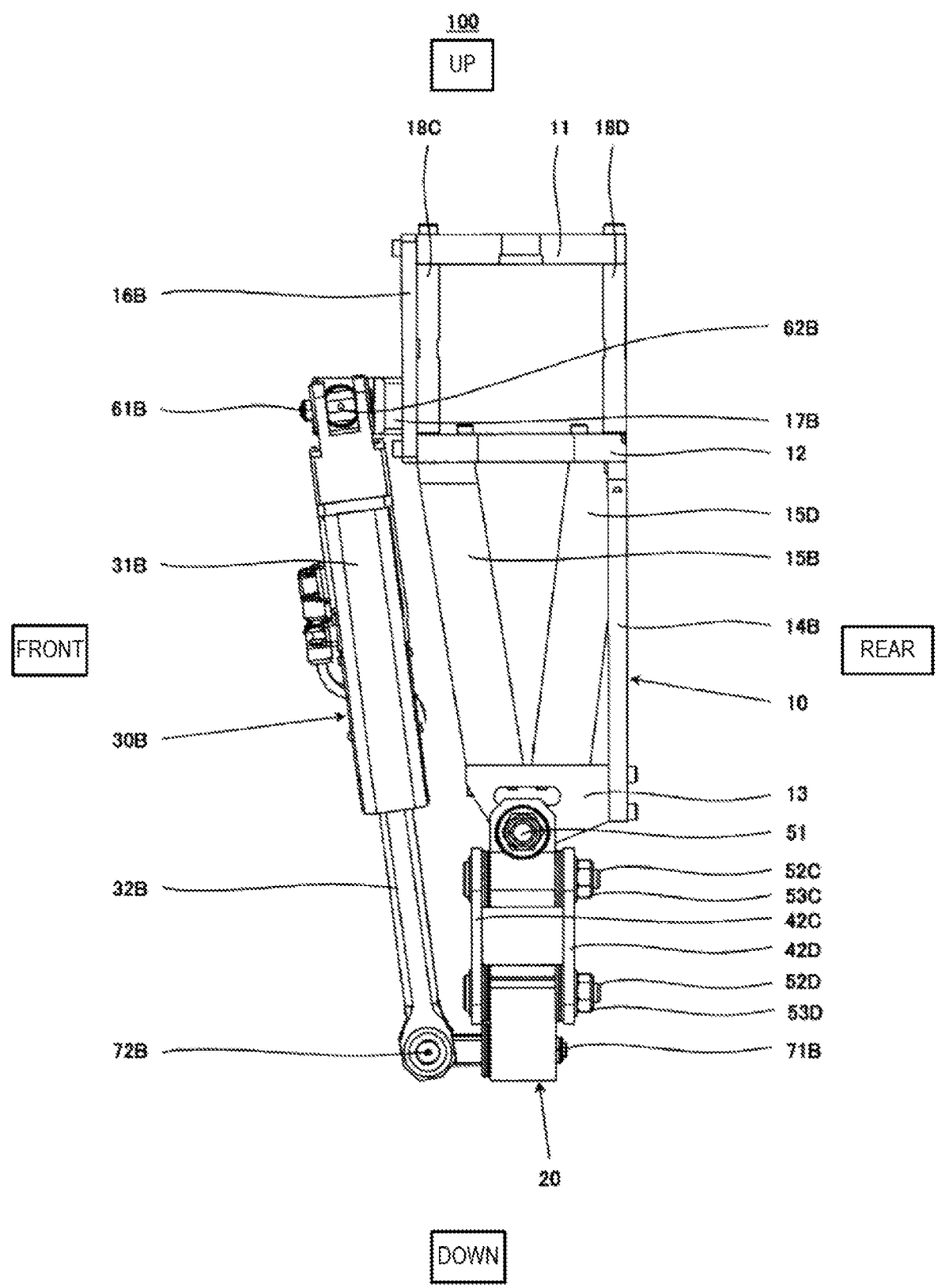
FIG. 5 is a left side view of the joint structure for the robot illustrated in FIG. 1.
Figure 6:
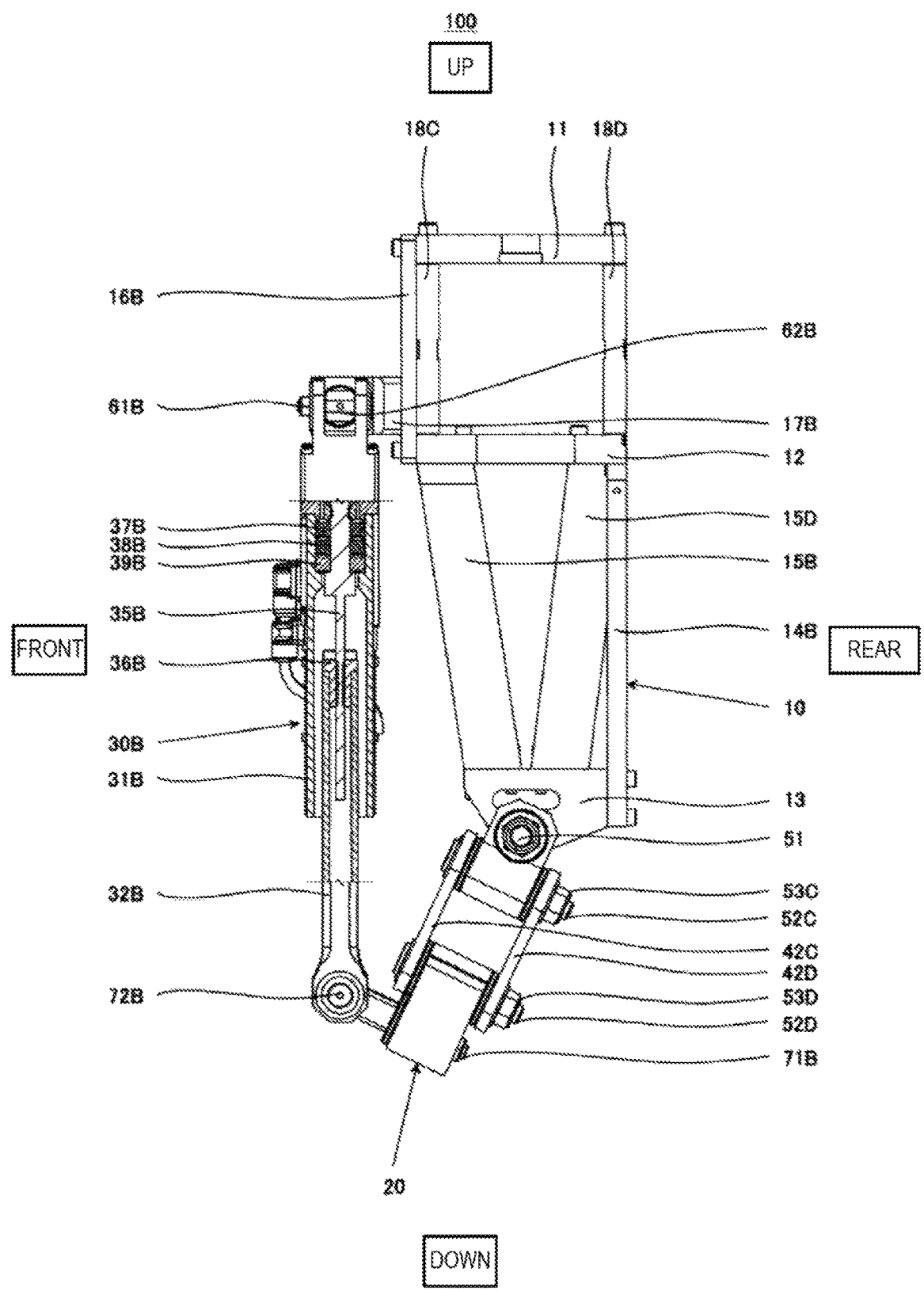
FIG. 6 is a left side view of the joint structure for the robot illustrated in FIG. 1.

FIGS. 1 and 2 are perspective views illustrating an outline structure of the joint structure for the robot according to Embodiment 1. FIG. 1 illustrates a state where the second link stands straight, and FIG. 2 illustrates a state where the second link is pivoted. FIGS. 3 and 4 are front views illustrating the outline structure of the joint structure for the robot illustrated in FIG. 1. FIG. 3 illustrates the state where the second link stands straight, and FIG. 4 illustrates the state where the second link is pivoted. FIGS. 5 and 6 are left side views of the joint structure for the robot illustrated in FIG. 1. FIG. 5 illustrates the state where the second link stands straight, and FIG. 6 illustrates the state where the second link is pivoted.

Note that, in FIGS. 1 and 2, an up-and-down direction, a front-and-rear direction, and a left-and-right direction of the joint structure for the robot are expressed as an up-and-down direction, a front-and-rear direction, and a left-and-right direction in the figures, and in FIGS. 3 and 4, the up-and-down direction and the left-and-right direction of the joint structure for the robot are expressed as an up-and-down direction and a left-and-right direction in the figures. Moreover, in FIGS. 5 and 6, the up-and-down direction and the front-and-rear direction of the joint structure for the robot are expressed as an up-and-down direction and a front-and-rear direction in the figures.

As illustrated in FIGS. 1 to 6, a joint structure 100 for the robot according to Embodiment 1 includes a first link 10, a second link 20, a first linear-motion actuator 30A, a second linear-motion actuator 30B, a joint part 40, and a control device 101. The second link 20 is relatively pivoted with respect to the first link 10 by the first linear-motion actuator 30A or the second linear-motion actuator 30B carrying out a deploy and retract operation. The first link 10 is pivotably coupled to the second link 20 through the joint part 40. Moreover, the first linear-motion actuator 30A and the second linear-motion actuator 30B couple the first link 10 to the second link 20 at a part separated from the joint part 40.

Note that, in the joint structure 100 for the robot according to Embodiment 1, the first link 10 may constitute, for example, an upper half part of a torso of the robot, the second link 20 may constitute a lower half part of the torso of the robot, and the joint part 40 may constitute a waist joint of the robot. Moreover, the control device 101 may be disposed in the first link 10, may be disposed in the second link 20, or may be disposed in a third casing 33A of the first linear-motion actuator 30A or a third casing 33B of the second linear-motion actuator 30B, which will be described later.

The first link 10 is formed in a lattice shape, and includes a first frame 11 and a second frame 12, a pedestal 13, first plate-shaped members 14A and 14B, and first pillar-shaped members 15A and 15B, second plate-shaped members 16A and 16B, and second pillar-shaped members 18A-18D.

The first frame 11 and the second frame 12 are each formed in a plate shape. The pedestal 13 is formed in a substantially rectangular parallelepiped shape, where a front part and a rear part of a lower surface thereof are notched. Moreover, a through-hole is formed in the left and right side surfaces of the pedestal 13, and a first shaft member 51 is inserted into the through-hole. The first shaft member 51 is disposed so that its axial center is oriented in the left-and-right direction. Note that, a bearing member (e.g., a bearing etc.) may be disposed in the through-hole of the pedestal 13.

The second frame 12 is disposed below the first frame 11, and the pedestal 13 is disposed below the second frame 12. The first frame 11 and the second frame 12 are connected with each other through the second plate-shaped members 16A and 16B and the second pillar-shaped members 18A-18D. Moreover, the second frame 12 and the pedestal 13 are connected with each other through the first plate-shaped members 14A and 14B and the first pillar-shaped members 15A and 15B. Note that the pedestal 13 is fitted into a recessed part of a first member 41 of the joint part 40 which will be described later. Moreover, the first member 41 is rotatably connected with the pedestal 13 through the first shaft member 51.

For example, the second plate-shaped members 16A and 16B are each attached to the first frame 11 and the second frame 12 so as to bridge between a front surface of the first frame 11 and a front surface of the second frame 12. The second pillar-shaped members 18A-18D are located between the first frame 11 and the second frame 12, and they are protruded from an upper surface of the second frame 12 so as to support a principal surface (lower surface) of the first frame 11. Moreover, the first plate-shaped members 14A and 14B are attached to the second frame 12 and the pedestal 13 so as to bridge between a rear surface of the second frame 12 and a rear surface of the pedestal 13. The first pillar-shaped members 15A and 15B are located between the second frame 12 and the pedestal 13, and they are protruded from an upper surface of the pedestal 13 so as to support a lower surface of the second frame 12.

Moreover, a protrusion 17A is provided to a front surface of the second plate-shaped member 16A of the first link 10, and a protrusion 17B is provided to a front surface of the second plate-shaped member 16B. A base-end part of the first linear-motion actuator 30A is coupled to the protrusion 17A so as to be rotatable about two mutually-perpendicular axes (a first shaft 61A and a second shaft 62A). Similarly, a base-end part of the second linear-motion actuator 30B is coupled to the protrusion 17B so as to be rotatable about two mutually-perpendicular axes (a first shaft 61B and a second shaft 62B).

Note that the first shafts 61A and 61B are disposed so that their axial centers are oriented in the front-and-rear direction, and the second shafts 62A and 62B are disposed so that their axial centers are oriented in the left-and-right direction. That is, the first shaft 61A and the second shaft 62A are disposed so that an angle formed by their axial centers becomes a right angle. Similarly, the first shaft 61B and the second shaft 62B are disposed so that an angle formed by their axial centers becomes a right angle.

A tip-end part of the first linear-motion actuator 30A is connected with the second link 20 so as to be rotatable about two mutually-perpendicular axes (a first shaft (not illustrated) and a second shaft 72A). Similarly, a tip-end part of the second linear-motion actuator 30B is connected with the second link 20 so as to be rotatable about two mutually-perpendicular axes (a first shaft 71B (see FIGS. 5 and 6) and a second shaft 72B).

The second link 20 is formed in a plate shape and two through-holes are formed in an upper part of a principal surface thereof. Moreover, near one of the through-holes of the second link 20, short strip-shaped second members 42A and 42B are disposed so as to sandwich the second link 20. Similarly, near the other through-hole of the second link 20, short strip-shaped second members 42C and 42D are disposed so as to sandwich the second link 20.

Through-holes are formed in lower parts of the second members 42A and 42B so as to communicate with one of the through-holes of the second link 20, and a second shaft member 52B is inserted into the through-holes. The second shaft member 52B is disposed so that its axial center is oriented in the front-and-rear direction. The second member 42A, the second shaft member 52B, and the second member 42B are fastened together with a nut member (not illustrated).

Similarly, through-holes are formed in lower parts of the second members 42C and 42D so as to communicate with the other through-hole of the second link 20, and a second shaft member 52D is inserted into the through-holes. The second member 42C, the second shaft member 52D, and the second member 42D are fastened together with a nut member 53D (see FIGS. 5 and 6).

Thus, the second link 20 is supported by the second shaft members 52B and 52D so as to be pivotable with respect to the second members 42A-42D. Note that bearing member(s) (e.g., bearing(s) etc.) may be disposed in any one or more through-holes among the two through-holes of the second link 20, and the through-holes formed in the lower parts of the second members 42A-42D.

The joint part 40 has the first member 41, the second members 42A-42D, the first shaft member 51, and the second shaft members 52A-52D, and pivotably couples the first link 10 to the second link 20. Moreover the first shaft member 51 and the second shaft members 52A-52D are disposed so that an angle formed by the axial center of the first shaft member 51 and the axial centers of the second shaft members 52A-52D becomes a right angle.

The first member 41 is formed in a substantially U-shape when seen in the front-and-rear direction of the joint structure 100, and has a bottom part and a pair of feet which stand from the bottom part. As described above, the pedestal 13 is fitted into the recessed part of the first member 41.

Moreover, through-holes are formed in side surfaces of the pair of feet of the first member 41 so as to communicate with the through-hole of the pedestal 13. The first shaft member 51 is inserted into the through-holes of the first member 41 and the through-hole of the pedestal 13. The first shaft member 51, the pedestal 13, and the first member 41 are fastened together with a nut member (not illustrated).

Thus, the first member 41 is supported by the first shaft member 51 so as to be rotatable with respect to the first link 10. Note that a bearing member (e.g., a bearing etc.) may be disposed in the through-holes of the first member 41.

Moreover, two through-holes are formed in the bottom part of the first member 41. The second members 42A and 42B are disposed near one of the through-holes of the first member 41 so as to sandwich the first member 41 therebetween. Similarly, near the other through-hole of the first member 41, the second members 42C and 42D are disposed so as to sandwich the first member 41 therebetween.

Through-holes are formed in the upper parts of the second members 42A and 42B so as to communicate with one of the through-holes of the first member 41, and the second shaft member 52A is inserted into the through-holes. The second shaft member 52A, the second member 42A, the first member 41, and the second member 42B are fastened together with a nut member (not illustrated).

Similarly, through-holes are formed in the upper parts of the second members 42C and 42D so as to communicate with the other through-hole of the first member 41, and the second shaft member 52C is inserted into the through-holes. The second shaft member 52C, the second member 42C, the first member 41, and the second member 42D are fastened together with a nut member 53C (see FIGS. 5 and 6).

Thus, the second members 42A-42D are supported by the second shaft member 52A or the second shaft member 52C so as to be rotatable with respect to the first member 41. Note that, bearing member(s) (e.g., bearing(s) etc.) may be disposed in at least one or more through-holes among the through-holes of the bottom part of the first member 41 and the through-holes of the upper parts of the second members 42A-42D.

By the joint part 40 constructed in this way, the second link 20 can be pivoted to the first link 10 about the direction of the axial center of the first shaft member 51 (the first direction). Moreover, the second link 20 can be pivoted by the joint part 40 about the direction of the axial centers of the second shaft members 52A-52D (the second direction).

Note that, in Embodiment 1, although the joint part 40 is divided into the two members (the first member 41 and the second members 42A-42D), it is not limited to this structure. As long as the second link 20 can be pivoted by the joint part 40 in the first direction or the second direction with respect to the first link 10, the joint part 40 may be comprised of one member, or may be comprised of three or more members.

Moreover, the first linear-motion actuator 30A includes a first casing (main body) 31A, a second casing 32A, the third casing 33A, a drive motor (not illustrated) accommodated in the third casing 33A, a rotary transmission mechanism 34A, and a ball screw mechanism (not illustrated) having a threaded shaft (shaft member) and a nut member. Thus, the rotation of the drive motor is transmitted to the threaded shaft through the rotary transmission mechanism 34A, and the nut member reciprocates by the rotation of the threaded shaft.

Similarly, the second linear-motion actuator 30B includes a first casing (main body) 31B, a second casing 32B, the third casing 33B, and a drive motor (not illustrated) accommodated in the third casing 33B, a rotary transmission mechanism 34B, and a ball screw mechanism (see FIG. 6) having a threaded shaft (shaft member) 35B and a nut member 36B. The rotation of the drive motor is transmitted to the threaded shaft 35B through the rotary transmission mechanism 34B, and the nut member 36B reciprocates by the rotation of the threaded shaft 35B.

Below, a structure of the second linear-motion actuator 30B will be described in detail with reference to FIG. 6. Note that, since the first linear-motion actuator 30A is constructed similar to the second linear-motion actuator 30B, the detailed description thereof is omitted.

The first to third casings 31B-33B are each formed in a rectangular parallelepiped shape in Embodiment 1. The first casing 31B and the third casing 33B are disposed in parallel to each other so that their extending directions become parallel. The second casing 32B is disposed so that an outer circumferential surface slides on the inner circumferential surface of the first casing 31B.

Stationary members 37B-39B are fixed to an upper end part of the inner circumferential surface of the first casing 31B. Through-holes are formed in the stationary members 37B-39B so that their axial centers are in agreement with each other, and a base-end part of the threaded shaft 35B is fittedly inserted into the through-holes. Thus, the threaded shaft 35B is rotatably fixed to the first casing 31B.

A thread is formed in an outer surface of a tip-end part of the threaded shaft 35B (not illustrated). The nut member 36B is disposed so as to threadedly engage with the thread. Note that, since the nut member 36B is constructed similar to nut members of known ball screw mechanisms, the detailed description thereof is omitted.

A base-end part of the second casing 32B is fixed to the nut member 36B. The base end of the second casing 32B is opened, and the tip-end part of the threaded shaft 35B is inserted. Moreover, a tip-end part of the second casing 32B is closed, and a through-hole extending in the left-and-right direction is formed. As described above, the second shaft 72B is fittedly inserted into the through-hole.

A through-hole is formed in an upper end face of the third casing 33B, and an output shaft of the drive motor (not illustrated) is inserted into the through-hole (see FIG. 1 etc.). The drive motor may be, for example, a servomotor which is servo-controlled by the control device 101. Moreover, the third casing 33B is provided with a rotation sensor (not illustrated) which detects a rotational position of the drive motor, a current sensor (not illustrated) which detects current for controlling the rotation of the drive motor. The rotation sensor may be, for example, an encoder.

Moreover, the base-end part of the threaded shaft 35B and the output shaft of the drive motor are connected with each other through the rotary transmission mechanism 34B (see FIG. 1 etc.). The rotary transmission mechanism 34B may be of arbitrary type, which can transmit the rotation of the drive motor to the threaded shaft 35B.

The rotary transmission mechanism 34B may be constructed so that, for example, a pulley is attached to each of the base-end part of the threaded shaft 35B and the output shaft of the drive motor, and a belt is wound around the pulleys, to transmit the rotation of the drive motor to the threaded shaft 35B. Alternatively, the rotary transmission mechanism 34B may be constructed so that, for example, a gear is attached to each of the base-end part of the threaded shaft 35B and the output shaft of the drive motor, and these gears are meshed with each other, to transmit the rotation of the drive motor to the threaded shaft 35B.

As illustrated in FIG. 6, the second linear-motion actuator 30B is disposed so that the direction of the axial center of the threaded shaft 35B is oriented in the vertical direction, when the second linear-motion actuator 30B carries out the deploy and retract operation. Similarly, the first linear-motion actuator 30A is disposed so that the direction of the axial center of the threaded shaft is oriented in the vertical direction, when the first linear-motion actuator 30A carries out the deploy and retract operation.

In other words, as illustrated in FIG. 5, when the second link 20 is in the upright state, the second linear-motion actuator 30B is disposed so as to incline to the vertical axis (Yaw axis) when seen in the left-and-right direction (so that an angle formed by the Yaw axis and the threaded shaft 35B becomes an acute angle). Similarly, when the second link 20 is in the upright state, the first linear-motion actuator 30A is disposed so as to incline to the vertical axis (Yaw axis) when seen in the left-and-right direction (so that an angle formed by the Yaw axis and the threaded shaft becomes an acute angle).

When the second link 20 is in the upright state, the first linear-motion actuator 30A and the second linear-motion actuator 30B are disposed so that an angle formed by the axial center of the threaded shaft of the first linear-motion actuator 30A and the axial center of the threaded shaft 35B of the second linear-motion actuator 30B becomes an acute angle (0 degrees or larger and less than 90 degrees) when seen in the front-and-rear direction (when seen from the front side of the joint structure for robot 100) (see FIG. 3). Moreover, the second shaft members 52A-52D are disposed toward the intersection of the axial center of the threaded shaft of the first linear-motion actuator 30A and the axial center of the threaded shaft 35B of the second linear-motion actuator 30B (here, downward).

Thus, as compared with the case where the first linear-motion actuator 30A and the second linear-motion actuator 30B are disposed so as to be parallel to each other when seen in the front-and-rear direction, the amplitude of the second link 20 which carries out the pivoting operation (especially, the pivoting operation in the left-and-right direction) corresponding to the deploy and retract operation of the first linear-motion actuator 30A or the second linear-motion actuator 30B, can be reduced.

Therefore, when the second link 20 is in the upright state, the first linear-motion actuator 30A and the second linear-motion actuator 30B can be disposed so that the angle formed by the Yaw axis and the threaded shaft 35B becomes smaller when seen in the left-and-right direction, thereby downsizing the joint structure 100.

Moreover, since the amplitude of the second link 20 can be reduced, it is not necessary to dispose an expensive and highly-precise rotation sensor or current sensor inside the third casing and, thus, the cost of the joint structure 100 can be reduced, i.e., the cost of the robot can be reduced. Further, the control of the drive motor by the control device 101 becomes easier.

Next, a configuration of the control device 101 will be described with reference to FIG. 7.

Figure 7:
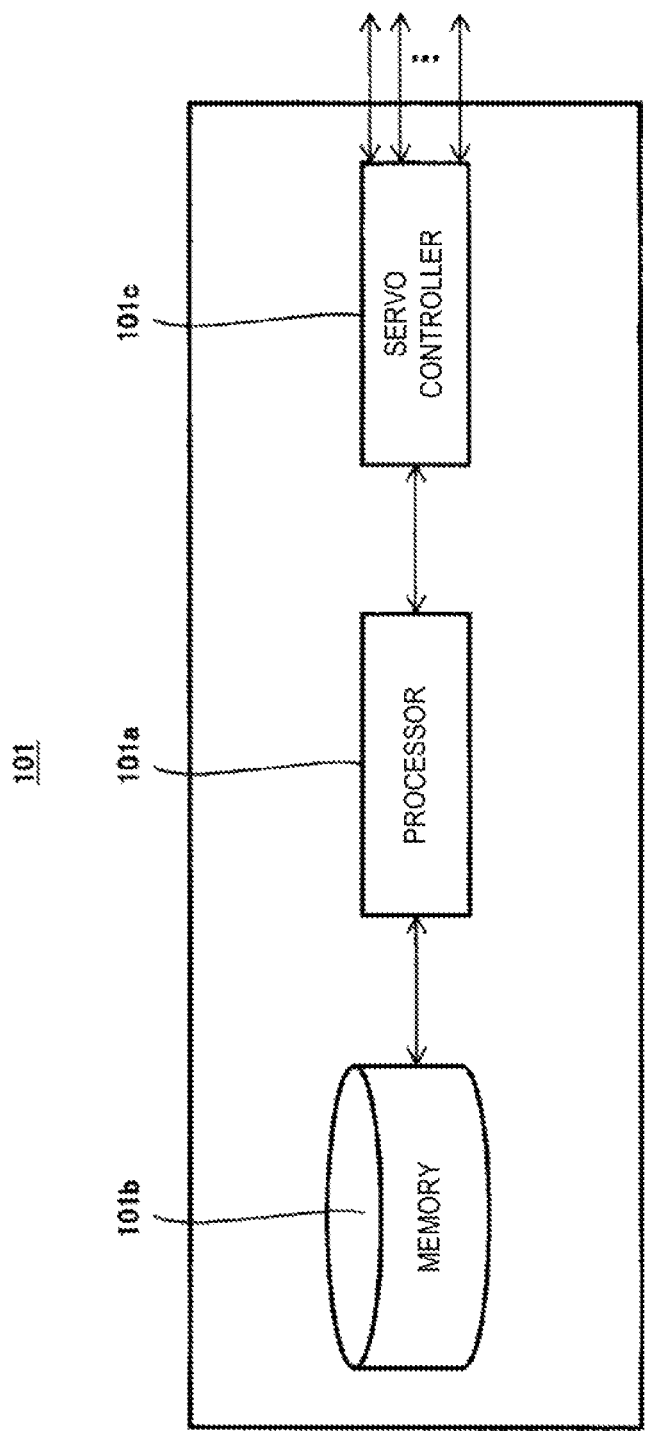
FIG. 7 is a functional block diagram schematically illustrating a configuration of a control device in the joint structure for the robot illustrated in FIG. 1.

FIG. 7 is a functional block diagram schematically illustrating the configuration of the control device in the joint structure for the robot illustrated in FIG. 1.

As illustrated in FIG. 7, the control device 101 includes a processor 101a, such as a CPU, a memory 101b, such as a ROM and/or a RAM, and a servo controller 101c. The control device 101 is a robot controller provided with a computer, such as a microcontroller, for example.

Note that the control device 101 may be comprised of a single control device 101 which carries out a centralized control, or may be comprised of a plurality of control devices 101 which collaboratively carry out a distributed control. Moreover, in Embodiment 1, although the memory 101b is, but not limited to be, disposed inside the control device 101, the memory 101b may be provided separately from the control device 101.

The memory 101b stores information on a basic program as the robot controller, various fixed data, etc. The processor 101a controls various operations of the robot by reading and executing software, such as the basic program stored in the memory 101b. That is, the processor 101a generates a control command for the robot, and then outputs it to the servo controller 101c. The servo controller 101c is configured to control the drive of the servomotors provided to each joint based on the control command generated by the processor 101a.

[Operation and Effects of Joint Structure for Robot]

Next, operation and effects of the joint structure 100 according to Embodiment 1 will be described. Note that the following operation is executed by the processor 101a of the control device 101 reading the given program stored in the memory 101b.

First, as illustrated in FIG. 5, suppose that the second link 20 is in the stand-up (upright) state. Then, suppose that the processor 101a of the control device 101 drives the drive motor of the first linear-motion actuator 30A so that the nut member of the first linear-motion actuator 30A moves toward the tip-end part of the threaded shaft, and drives the drive motor of the second linear-motion actuator 30B so that the nut member of the second linear-motion actuator 30B moves toward the tip-end part of the threaded shaft.

Then, the second casing 32A of the first linear-motion actuator 30A moves toward the first casing 31A to contract or retract the first linear-motion actuator 30A. Similarly, the second casing 32B of the second linear-motion actuator 30B moves toward the first casing 31B to contract or retract the second linear-motion actuator 30B. Thus, a distance between the second shaft 62A and the second shaft 72A and a distance between the second shaft 62B and the second shaft 72B become smaller, and the second link 20 rotates forward around the first shaft member 51 with respect to the first link 10 and becomes in a state where the second link 20 is inclined as illustrated in FIG. 6.

On the other hand, as illustrated in FIG. 6, suppose that, when the second link 20 is in the inclined state, the control device 101 drives the drive motor of the first linear-motion actuator 30A so that the nut member of the first linear-motion actuator 30A moves toward the base-end part of the threaded shaft, and drives the drive motor of the second linear-motion actuator 30B so that the nut member of the second linear-motion actuator 30B moves toward the base-end part of the threaded shaft.

Then, the second casing 32A of the first linear-motion actuator 30A moves so as to be separated from the first casing 31A, and the first linear-motion actuator 30A deploys or extends. Similarly, the second casing 32B of the second linear-motion actuator 30B moves so as to be separated from the first casing 31B, and the second linear-motion actuator 30B deploys or extends. Thus, the distance between the second shaft 62A and the second shaft 72A and the distance between the second shaft 62B and the second shaft 72B become larger, and the second link 20 is rotated rearward around the first shaft member 51 with respect to the first link 10, and becomes in the state where the second link 20 stands straight, as illustrated in FIG. 5.

Moreover, as illustrated in FIG. 6, when the second link 20 is in the inclined state, as the control device 101 operates one of the first linear-motion actuator 30A and the second linear-motion actuator 30B, or as one of the linear-motion actuators drives the drive motor so that the nut member moves toward the base-end part of the threaded shaft, and the other linear-motion actuator drives the drive motor so that the nut member moves toward the tip-end part of the threaded shaft, the lengths of the two linear-motion actuators become different from each other. That is, the distance between the second shaft 62A and the second shaft 72A becomes different from the distance between the second shaft 62B and the second shaft 72B.

Thus, the second members 42A and 42B are rotated in the left-and-right direction around the second shaft member 52A with respect to the first member 41 (the first link 10), and the second members 42C and 42D are rotated in the left-and-right direction around the second shaft member 52C with respect to the first member 41. Moreover, the second link 20 is rotated in the left-and-right direction around the second shaft member 52B with respect to the second members 42A and 42B, and is rotated in the left-and-right direction around the second shaft member 52D with respect to the second members 42C and 42D. That is, the second link 20 rotates around the direction of the axial center of the second shaft member (the second direction) with respect to the first link 10, and as illustrated in FIG. 2 or FIG. 4, it becomes in the inclined state.

In the joint structure 100 for the robot according to Embodiment 1 constructed in this way, the first linear-motion actuator 30A and the second linear-motion actuator 30B are connected to the first link 10 and the second link 20 so as to be rotatable about the two mutually-perpendicular axes, and the joint part 40 couples the second link 20 to the first link 10 so as to be rotatable about the first shaft member 51 or the second shaft members 52A-52D. When the second link 20 is in the upright state, the first shaft member 51 and the second shaft members 52A-52D are disposed so that their axial centers are perpendicular to each other and are oriented in the horizontal direction.

Thus, the second link 20 can be pivoted to the first link 10 around the first shaft member 51 or the second shaft members 52A-52D which are perpendicular to each other and are oriented horizontally by operating the first linear-motion actuator 30A or the second linear-motion actuator 30B, with the simple structure.

Moreover, since the connecting direction of the first link 10 and the second link 20 (the direction in which the first link 10 and the second link 20 are disposed; the up-and-down direction) can be substantially in agreement with the directions of the axial centers of the shaft members of the first linear-motion actuator 30A and the second linear-motion actuator 30B, the length in a direction perpendicular to the lined-up direction of the first linear-motion actuator 30A and the second linear-motion actuator 30B (specifically, a thickness direction of the robot; the front-and-rear direction) can be reduced. Therefore, the robot can be downsized.

Moreover, in the joint structure 100 for the robot according to Embodiment 1, when the second linear-motion actuator 30B carries out the deploy and retract operation, the second linear-motion actuator 30B is disposed so that the direction of the axial center of the threaded shaft 35B is oriented in the vertical direction. Similarly, when the first linear-motion actuator 30A carries out the deploy and retract operation, the first linear-motion actuator 30A is disposed so that the direction of the axial center of the threaded shaft is oriented in the vertical direction.

Thus, when seen in the left-and-right direction, as compared with the case where the first linear-motion actuator 30A and the second linear-motion actuator 30B are disposed so as to be parallel to each other, the amplitude of the second link 20 that carries out the pivoting operation corresponding to the deploy and retract operation of the first linear-motion actuator 30A or the second linear-motion actuator 30B can be reduced.

Therefore, it is not necessary to dispose the expensive and highly-precise rotation sensor or current sensor inside the third casing, and the cost of the joint structure 100 can be reduced, i.e., the cost of the robot can be reduced. Further, the control of the drive motor by the control device 101 becomes easier.

Further, in the joint structure 100 for the robot according to Embodiment 1, when the second link 20 is in the upright state, the first linear-motion actuator 30A and the second linear-motion actuator 30B is disposed so that, the angle formed by the axial center of the threaded shaft of the first linear-motion actuator 30A and the axial center of the threaded shaft 35B of the second linear-motion actuator 30B becomes an acute angle when seen in the front-and-rear direction. Moreover, the second shaft members 52A-52D are disposed toward the intersection of the axial center of the threaded shaft of the first linear-motion actuator 30A and the axial center of the threaded shaft 35B of the second linear-motion actuator 30B (here, downward).

Thus, when seen in the front-and-rear direction, as compared with the case where the first linear-motion actuator 30A and the second linear-motion actuator 30B are disposed so as to be parallel to each other, the amplitude of the second link 20 that carries out the pivoting operation corresponding to the deploy and retract operation of the first linear-motion actuator 30A or the second linear-motion actuator 30B, can be reduced.

Therefore, when the second link 20 is in the upright state, the first linear-motion actuator 30A and the second linear-motion actuator 30B can be disposed so that the angle formed by the Yaw axis and the threaded shaft 35B becomes smaller when seen in the left-and-right direction, thereby downsizing the joint structure 100.

Moreover, since the amplitude of the second link 20 can be reduced, it is not necessary to dispose the expensive and highly-precise rotation sensor or current sensor inside the third casing, and the cost of the joint structure 100 can be reduced, i.e., the cost of the robot can be reduced. Further, the control of the drive motor by the control device 101 becomes easier.

It is apparent for a person skilled in the art that many improvements or other embodiments of the present disclosure are possible from the above description. Therefore, the above description is to be interpreted only as illustration, and it is provided in order to teach a person skilled in the art the best mode that implements the present disclosure. The details of the structures and/or the functions may be substantially changed, without departing from the spirit of the present disclosure.

INDUSTRIAL APPLICABILITY

Since the joint structure for the robot of the present disclosure has the simple structure, and the second link is pivotable around the first shaft member or the second shaft member with respect to the first link, it is useful in the industrial robot field.

DESCRIPTION OF REFERENCE CHARACTERS

10 First Link
11 First Frame
12 Second Frame
13 Pedestal
14A First Plate-shaped Member
15A First Pillar-shaped Member
16A Second Plate-shaped Member
16B Second Plate-shaped Member
17A Protrusion
17B Protrusion
18A Second Pillar-shaped Member
20 Second Link
30A First Linear-motion Actuator
30B Second Linear-motion Actuator
31A First Casing
31B First Casing
32A Second Casing
32B Second Casing
33A Third Casing
33B Third Casing
34A Rotary Transmission Mechanism
34B Rotary Transmission Mechanism
35B Threaded Shaft
36B Nut Member
37B Stationary Member
40 Joint Part
41 First Member
42A Second Member
42B Second Member
42C Second Member
42D Second Member
51 First Shaft Member
52A Second Shaft Member
52B Second Shaft Member
52C Second Shaft Member
52D Second Shaft Member
53C Nut Member
53D Nut Member
61A First Shaft
61B First Shaft
62A Second Shaft
62B Second Shaft
71B First Shaft
72A Second Shaft
72B Second Shaft
100 Joint Structure
101 Control Device
101*a* Processor
101*b* Memory
101*c* Servo Controller

The invention claimed is:

1. A joint structure for a robot, comprising:
a first link and a second link, rotatably coupled to each other through a joint part; and
a first linear-motion actuator and a second linear-motion actuator, each having a main body and a shaft member configured to linearly move in an axial center direction relatively to the main body, the linear-motion actuators coupling the first link to the second link at a part separated from the joint part, wherein
the first linear-motion actuator and the second linear-motion actuator are each connected with the first link and the second link so as to be rotatable about two axes perpendicular to each other,
the joint part couples the second link to the first link so as to be rotatable about one of a first shaft member and a second shaft member,
when the second link is in an upright state, the first shaft member and the second shaft member are disposed so that axial centers thereof are horizontal and are perpendicular to each other when viewed along a direction orthogonal to horizontal, one of the two axes extends in the same direction as the first shaft member, and the other of the two axes extends in the same direction as the second shaft member, and
the first linear-motion actuator and the second linear-motion actuator are disposed so that an angle formed by the axial center of the shaft member of the first linear-motion actuator and the axial center of the shaft member of the second linear-motion actuator becomes an acute angle.

2. The joint structure of claim 1, wherein the first linear-motion actuator and the second linear-motion actuator are disposed so that directions of the axial centers of the shaft members are oriented in a vertical direction when the linear-motion actuators carry out a deploy and retract operation.

3. A joint structure for a robot, comprising:
a first link,
a second link,
a joint part, wherein the first link and the second link are rotatably coupled to each other through the joint part; and
a first linear-motion actuator that includes a first main body and a first shaft member configured to linearly move in an axial direction of the first main body and relatively to the first main body,
a second linear-motion actuator that includes a second main body and a second shaft member configured to linearly move in an axial direction of the second main body and relatively to the second main body, wherein
the first linear-motion actuator and the second linear motion actuator couple the first link to the second link at positions separated from the joint part,
the first linear-motion actuator and the second linear-motion actuator are each connected with the first link so as to be rotatable about two axes perpendicular to each other and the second link so as to be rotatable about two axes perpendicular to each other,
the joint part couples the second link to the first link so as to be rotatable about one of a third shaft member and a fourth shaft member,
when the second link is in an upright state, the third shaft member and the fourth shaft member are disposed so that an angle formed between a first plane perpendicular to an axial center of the third shaft member and a second plane perpendicular to an axial center of the fourth shaft member is a right angle, the axial center of the third shaft member is horizontal, the axial center of the fourth shaft member is horizontal, one of the two axes extends in the same direction as the third shaft member, and the other of the two axes extends in the same direction as the fourth shaft member, and
the first linear-motion actuator and the second linear-motion actuator are disposed so that an angle formed by the axial center of the first shaft member and the axial center of the second shaft member becomes an acute angle.

4. A joint structure for a robot, comprising:
a first link and a second link, rotatably coupled to each other through a joint part; and
a first linear-motion actuator and a second linear-motion actuator, each having a main body and a shaft member configured to linearly move in an axial center direction relatively to the main body, the linear-motion actuators coupling the first link to the second link at a part separated from the joint part, wherein
the first linear-motion actuator and the second linear-motion actuator are each connected with the first link and the second link so as to be rotatable about two axes perpendicular to each other,
the joint part couples the second link to the first link so as to be rotatable about one of a first shaft member and a second shaft member,
when the second link is in an upright state, the first shaft member and the second shaft member are disposed so that axial centers thereof are horizontal and are perpendicular to each other when viewed along a direction orthogonal to horizontal, and
the first linear-motion actuator and the second linear-motion actuator are disposed so that an angle formed by the axial center of the shaft member of the first linear-motion actuator and the axial center of the shaft member of the second linear-motion actuator becomes an acute angle.

* * * * *